United States Patent [19]

Yasuno

[11] Patent Number: 4,824,687
[45] Date of Patent: Apr. 25, 1989

[54] PROCESS FOR MANUFACTRING FABRICATED CRAB LEG MEAT

[76] Inventor: Shigeo Yasuno, 9-27, Toneri-chome, Adachi-ku, Tokyo, Japan

[21] Appl. No.: 194,887

[22] Filed: May 17, 1988

Related U.S. Application Data

[62] Division of Ser. No. 918,007, Oct. 10, 1986.

[30] Foreign Application Priority Data

Oct. 15, 1985 [JP] Japan .............................. 60-229566
Mar. 26, 1986 [JP] Japan .............................. 61-067937

[51] Int. Cl.4 .............................................. A23L 1/325
[52] U.S. Cl. ...................................... 426/643; 426/92; 426/104; 426/388; 426/513; 426/802
[58] Field of Search ................. 426/92, 140, 104, 284, 426/643, 518, 513, 517, 802, 388

[56] References Cited

U.S. PATENT DOCUMENTS

| | | | |
|---|---|---|---|
| 3,718,481 | 2/1973 | Joaquin | 426/92 |
| 4,151,096 | 6/1988 | Nada et al. | 426/643 |
| 4,158,065 | 6/1979 | Sugino | 426/104 |
| 4,303,688 | 12/1981 | Shimura et al. | 426/643 |
| 4,309,450 | 1/1982 | Seibert | 426/92 |
| 4,544,561 | 10/1985 | Komukai | 426/104 |
| 4,548,823 | 10/1985 | Morimoto | 426/104 |
| 4,579,741 | 4/1986 | Hanson et al. | 426/104 |
| 4,588,601 | 5/1986 | Maruyama et al. | 426/643 |

Primary Examiner—Arthur L. Corbin
Attorney, Agent, or Firm—Burgess, Ryan & Wayne

[57] ABSTRACT

Fabricated meat products like crab leg meat, which are copies of the first joint portion of the king crab or giant spider crab, and the process for manufacturing the same.

The fabricated crab leg meat comprises:

a central portion which comprises at least one material selected from a group consisting of fibrous material of ground fish meat, flake of fish meat and flake of crustacean meat; and a sheet-like material which mainly comprises ground fish meat, which has cornua on the outer surface thereof and which wraps around the central portion. The fabricated meat product is formed in a shape of crab leg meat.

11 Claims, 4 Drawing Sheets

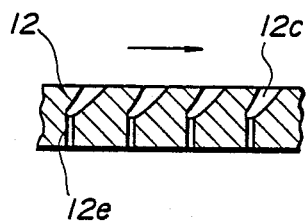
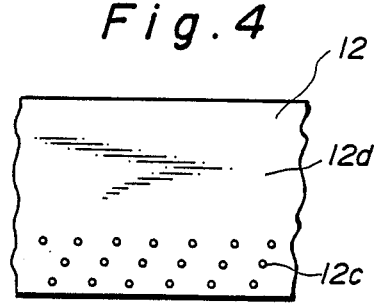
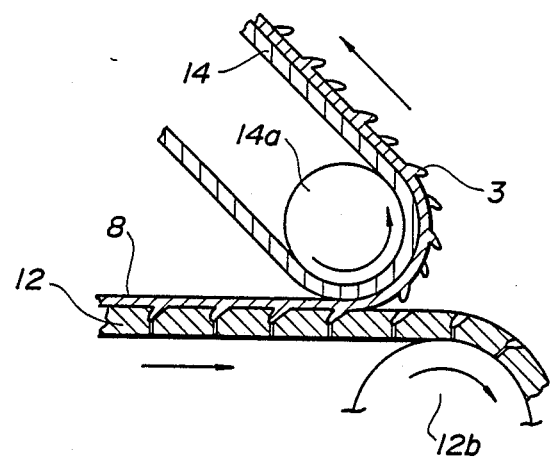

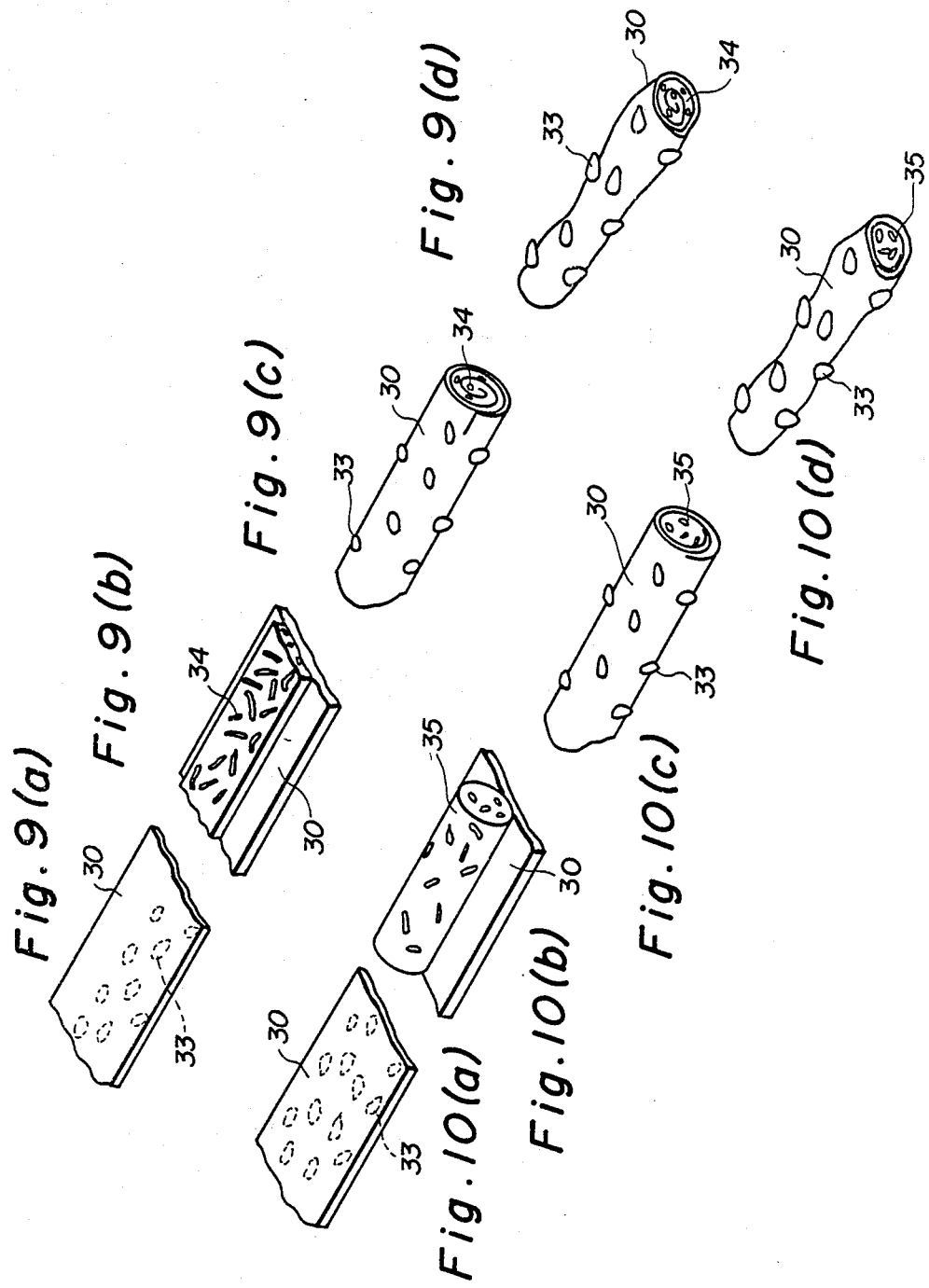

PROCESS FOR MANUFACTRING FABRICATED CRAB LEG MEAT

This is a division of application Ser. No. 918,007, filed Oct. 10, 1986.

BACKGROUND OF THE INVENTION

1. Technical Field of the Inventiom

The present invention relates to fabricated meat products like crab leg meat and a process for manufacturing the same. More specifically, the present invention relates to fabricated meat products, which are copies of the first joint portion of the king crab (*Paralithodes camtchaticus*) or giant spider crab, and the process for manufacturing the same.

2. Prior Art

Boiled fish paste, which is obtained by slicing ground fish meat into strip like fibers and shaping the strips into a form of crab leg meat, have been widely sold.

Japanese Patent Publication No. 55-42826 discloses a conventional method for forming boiled fish paste like crab leg meat, wherein fibrous materials formed in strips are gathered together and are wrapped by a thin film.

In this case, a film having an inner surface colored red may be used to package the boiled paste, and the packages thus obtained may be shipped.

Alternatively, ground fish meat may be heated while it is wrapped by a film having an inner surface colored red so that the coloring agent is printed onto the obtained fish paste. Thereafter, the film is removed, and the packages thus obtained may be shipped.

The above-described conventional products have appearances like crab leg meat when they are sold. However, the fibrous materials are readily separated from each other when they are cooked, since they are loosely bound together. Accordingly, the conventional boiled fish paste is mainly used in salad or boiled rice with assorted mixtures.

Japanese Patent Application Laid-open No. 60-43362 discloses another method for manufacturing boiled fish paste like crab leg meat, wherein ground fish meat is spread into a thin sheet, then, the sheet is incompletely sliced by parallel slits having a small distance therebetween, and thereafter, the sliced sheet is twisted into a string like twisted paper. Since the boiled fish paste is twisted into a string, it is more durable than that disclosed in the above-described Japanese Patent Publication No. 55-42826. However, the boiled fish may be relatively readily separated since the fibrous materials in the boiled fish paste are bounded by partially connected portions, which are obtained by incompletely slicing.

SUMMARY OF THE INVENTION

As described above, the conventional boiled fish paste like crab leg meat has a problem that it can be used only with salad or boiled rice with assorted mixtures in a separated condition since the fibrous materials are readily separated and that it does not maintain its shape when it is burned as a crab leg meat steak or served in the pot.

Further, the conventional boiled fish paste has a relatively flat outer surface because its outer surface does not have cornua, which are common on the first joint of the king crab, whose quality is highly appreciated among the natural crabs from its appearance and taste, and therefore, the conventional boiled fish paste is insufficient in its quality.

Taking into consideration the problems inherent to the conventional boiled fish paste formed into crab leg meat shape, it is an object of the present invention to provide fabricated meat products like crab leg meat, which have appearances of high quality since their outer surfaces have cornua like the first joint of the king crab, whose quality is highly appreciated among the natural crabs and which maintain their shape when they are burned as a crab leg meat steak or served in the pot.

It is another object of the present invention to provide a process for manufacturing the above-described fabricated meat products like crab leg meat.

The present invention provides fabricated meat product like crab leg meat which comprises:

a central portion which comprises at least one material selected from a group consisting of fibrous material of ground fish meat, flake or fish meat and flake of crustacean meat; and a sheet-like material which mainly comprises ground fish meat, which has cornua at the outer surface thereof and which wraps around the central portion. The fabricated meat product is formed in a shape of crab leg meat.

Further, the present invention provides a process for manufacturing such fabricated meat product like crab leg meat, which process comprises:

a step wherein ground meat mainly comprising fish meat is spread in a sheet onto a die member having cornua forming recesses on the outer surface thereof so as to form a sheet-like material having cornua on the outer surface thereof;

a step wherein ground meat mainly comprising fish meat is spread in a sheet, and slits extending in a longitudinal direction of the sheet are sliced onto the sheet so as to form fibrous material; and a step wherein the fibrous material is gathered into a bar shape, and the bar shaped fibrous material is wrapped by the sheet-like material having cornua.

The present invention also provides another process for manufacturing such fabricated meat product like crab leg meat, which process comprises:

a step wherein ground meat mainly comprising fish meat is spread in a sheet onto a die member having cornua forming recesses on the outer surface thereof so as to form a sheet-like material having cornua on the outer surface thereof; and a step wherein flake of fish meat or flake of crustacean meat is wrapped by the sheet-like material having cornua.

The fabricated meat product like crab leg meat of the present invention has cornua at the outer surface thereof. When the size of the cornua is large, the fabricated meat product like crab leg meat of the present invention is similar to the first joint portion of the king crab, which has the highest quality in the natural crabs. When the fabricated meat product of the present invention has many small cornua formed at the outer surface thereof, the fabricated meat product like crab leg meat is similar to the legs of the giant spider crab. The thus obtained fabricated meat products of the present invention have appearances of high quality since their outer surfaces have cornua like the giant spider crab and they enhance beauty of the meal when they are burned as a crab leg meat steak or served in the pot.

Further, according to the fabricated meat products like crab leg meat of the present invention, since a fibrous material or flake-like material is wrapped by the sheet-like material, which is not cut, the products do not scatter into small pieces and maintain their delicious shape when they are burned as a crab leg meat steak or served in the pot.

According to the process of the present invention, the above-described fabricated meat product like crab leg meat is manufactured by:

a step wherein ground meat mainly comprising fish meat is spread in a sheet onto a die member having cornua forming recesses on the outer surface thereof so as to form a sheet-like material having cornua on the outer surface thereof;

a step wherein ground meat mainly comprising fish meat is spread in a sheet, and slits extending in a longitudinal direction of the sheet is formed onto the sheet so as to form fibrous material; and a step wherein the fibrous material is gathered into a bar shape, and the bar shaped fibrous material is wrapped by the sheet-like material having cornua.

It is preferred that the depth of the slits extending in a longitudinal direction of the sheet-like material is made smaller than the thickness of the sheet-like material so as to form thin portions which connect the portions in the fibrous material and that the fibrous material can be formed in a bar shape by rolling the fibrous material like vinegared rice rolled in layer or a twisted paper string.

Further it is preferred that cornua and slits are formed on different portions on a same sheet-like material so that the sheet-like material having cornua and the fibrous material are formed in a single substantially continuous sheet. When the sheet-like material is twisted from the fibrous material to the sliced sheet-like material like vinegared rice rolled in layer or a twisted paper string, the above-described fabricated meat products like crab leg meat are manufactured in one step wherein the sheet-like material is gathered in a bar shape, and the bar shaped fibrous material is wrapped by the sheet-like material having cornua at the outer surface thereof.

When flake of crustacean meat, such as meat of crab, or flake of fish meat is used for the central portion of the present invention, since the flake is already in a fibrous condition, it is preferred that the flake is extruded from a cap and its periphery is wrapped by the sheet-like material or that the flake is extruded in a film on the sheet-like material and the filmy flake and the sheet-like material are twisted together.

BRIEF DESCRIPTION OF THE DRAWINGS

The present invention will now be explained in detail with reference to the accompanying drawings, wherein:

FIG. 3 is an enlarged sectional view taken along the longitudinal direction of a belt conveyor employed in the apparatus illustrated in FIG. 2;

FIG. 4 is a partial plan view of the belt conveyor employed in the apparatus illustrated in FIG. 2;

FIG. 5 is an enlarged elevation view illustrating the condition wherein boiled fish paste formed in a thin plate is separated from a belt conveyor;

FIG. 9 and 10 are perspective views illustrating other embodiments of the present invention.

PREFERRED EMBODIMENTS

Figure 2:
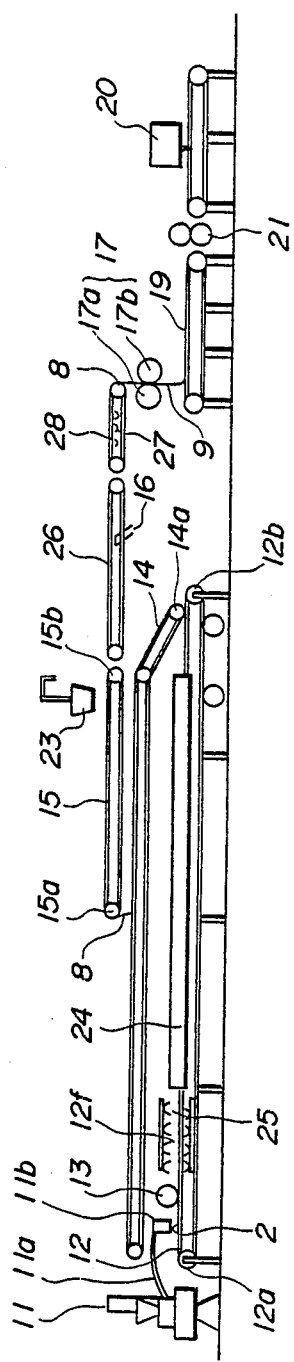
FIG. 2 is a schematic elevation view of an apparatus wherein the process according to the present invention is carried out.

Referring to FIG. 2, a former 11 is used to grind meat of fishes, such as Alaska pollack, while starch, salt, seasoning or flavoring is preferably added to the ground meat, to manufacture ground fish meat 2. Waste meat of crustacean meat formed in flake may be added to ground fish meat 2. Further crust may be mixed with ground fish meat 2 up to 3 to 5 % after the crust has been ground in a pasty condition. Addition of pasty crust may enhance flavor, taste, smell or color of ground fish meat 2. Alternatively, flavor of crab or calcium may be added to ground fish meat 2.

The former 11 supplies ground fish meat 2 onto a belt conveyor 12 at a position in front of a press roller 13 from one or more caps 11b formed in an elongated slit extending in a widthwise direction of the belt conveyor 12 and disposed at the front end of a hose 11a.

The ground fish meat 2 is pressed by the press roller 13 so that it is spread onto the belt conveyor 12 in a sheet having a thickness, for example, between about 0.5 and 2.5 mm. It is preferred that water, oil or the like is applied to the belt conveyor 12 and/or the press roller 13 so that the ground fish meat is prevented from being adhered to the belt conveyor 12 and press roller 13.

The sizes of slit caps 11b, the amount of the ground fish meat supplied from slit caps 11b, or the clearances between the press roller 13 and the belt conveyor 12 may be varied along the widthwise direction of the belt conveyor 12, so that the thickness of the ground fish meat 2 is non-uniform in the widthwise direction. For example, thickness of the ground fish meat portion, where the cornua 3 which will be explained later are, may be made thinner than the remining portion so as to be similar to the natural crabs. Contrary to this, thickness of the ground fish meat portion with the cornua 3 may be made thicker than the remaining portion so as to prevent the fibrous material from being scattered.

The belt conveyor 12 is made of a material having high temperature durability, such as silicon rubber, polytetrafluoroethylene (known under the registered trademark "Teflon"), so that it is durable to heat treatment in the heating device 14, which will be explained later. The belt conveyor 12 engages with a pair of pulleys 12a and 12b.

The belt conveyor 12 is an embodiment of the die member of the present invention, and as illustrated in FIG. 4, it has a plurality of cornua forming recesses 12c on the surface at a widthwise part thereof. The surface of the remaining portion 12d of the belt conveyor 12, where no cornua forming recesses 12c are formed, is flat.

Alternatively, a plurality of metal plates having cornua forming recesses formed thereon are prepared and are coated with silicon or polytetrafluoroethylene, and the thus obtained plurality of metal plates may be connected together in an endless loop to form belt conveyor 12.

The cornua forming recess 12c is formed in a substantially cone shape as illustrated in FIG. 3. It is preferred that the axis of the cornua forming recess 12c is slightly inclined against the surface of the belt conveyor 12 in a direction opposite to the moving direction (illustrated by an arrow) of the belt conveyor 12 so that the filling of the ground fish meat 2 into the cornua forming recess 12c by the press roller 13 is assured.

The number and the size of the cornua forming recesses 12c are suitably determined depending on the kind and size of the crabs, which are copied by the present invention. For example, when the fabricated meat products like king crab leg meat are produced, the length of the cornua is between 3 and 20mm, and the number of the cornua is relatively small. Contrary to this, when the fabricated meat products like giant spider crab let meat are produced, many cornua having a relatively small height of about 1mm are formed.

The bottom of the cornua forming recess 12c is communicated with the outside via an air bleeding hole 12e, so that the air within the cornua forming recess 12c is bled when the ground fish meat 2 is filled within the cornua forming recess 12c.

The belt conveyor 12 has a set up region 12f provided for a predetermined length from its entrance, and in the set up region 12f, the ground fish meat 2 is slightly heated from both sides by means of a heating device 25 of propane gas type so that the surface of the ground fish meat 2 is dehydrated and its luster and color are enhanced.

At the downstream end of the set up region 12f, a heating device 24 of a conventionally known steam or burning type encircles the belt conveyor 12, so that the ground fish meat 2 is heated at a temperature higher than 80° C., for example, between 90° and 95° C., for a time interval between 5 and 8 minutes to form a boiled fish paste of thin plate type.

A lower pulley 14a of a separating conveyor 14 is located just above the pulley 12b located at the exit end of the belt conveyor 12. As illustrated in FIGS. 2 and 5, the separating conveyor 14 is extending upwardly from the lower pulley 14a forming an acute angle with the belt conveyor 12 and is extending in a direction reverse to that of the belt conveyor 12.

After the thin plate-like boiled fish paste 8 with cornua 3 is manufactured by the heating device 24 extending over the belt conveyor 12, it is lifted along the tangent line of the lower pulley 14a by the separating conveyor 14 as illustrated in FIG. 5 so that the cornua 3 are smoothly separated from the cornua forming recesses 12a of the belt conveyor 12. Thus, the cornua 3 direct upwardly, and the thin plate-like boiled fish paste 8 is moved upwardly by means of the separating conveyor 14. It is preferred that the belt conveyor 12 is made of a material, such as silicon rubber or polytetrafluoroethylene, to which ground fish meat 2 does not easily adhere, so that the separation of the boiled fish paste can be done readily.

When the separating conveyor 14 is extending ina direction reverse to the belt conveyor 12 as described above, large cornua 3 are smoothly separated from the cornua forming recesses 12c without being damaged. However, if the size of the cornua 3 is small, the separating conveyor may be extended in the same direction as that of the belt conveyor 12.

Another belt conveyor 15 extends from a pulley 15a located above the separating conveyor 14 to another pulley 15b. As the thin plate-like boiled fish paste 8 is transferred from the separating conveyor 14 to the conveyor 15, the cornua 3 direct downwardly.

The thin plate-like boiled fish paste 8 is cooled while it is moved on the separating conveyor 14 and the conveyor 15. Then a suitable amount of ground fish meat is fed from a ground fish meat filling machine 23 onto the thin plate-like boiled fish paste 8 on the conveyor 15 as a bonding agent. Another bonding agent may be used in place of the ground fish meat, and in some cases, bonding agent may be omitted.

Further, the thin plate-like boiled fish paste 8 is transferred from the conveyor 15 to a net conveyor 26, where the thin plate-like boiled fish paste 8 is applied with red coloring agent at the cornua 3 and their neighboring portions from a tinter 16 disposed below the next conveyor 26. Then the red coloring agent is dried by an electric heater 27 or the like disposed near the net conveyor 28, so that the surface of the thin plate-like boiled fish paste 8 is colored like that of the natural crab leg meat. Alternatively, coloring agent may have been mixed with the ground fish meat 2, which become cornua 3 in the succeeding step, in the former 11, and tinter 16 may be omitted.

A cooling air blowing device is disposed in front of or behind the tinter 16 so that cooling air is blown towards the thin plate-like boiled fish paste 8.

A roller type slitting machine 17 comprises a pair of rollers 17a and 17b and is disposed at the downstream end of the net conveyor 28.

Figure 6:
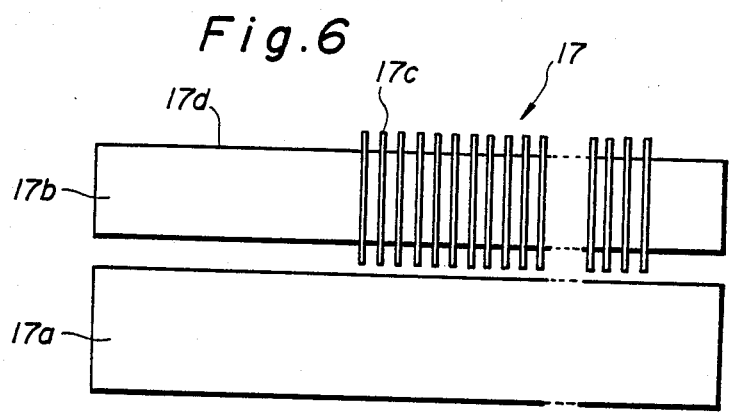
FIG. 6 is a side view of a roller type slitting machine illustrated in FIG. 2.

As illustrated in FIG. 6, the roller 17a is formed in a flat cylinder, while the roller 17b has a cylinder portion of a small diameter at a portion 17d corresponding to the portion 6 of the thin plate-like boiled fish paste 8 having cornua 3, and the remaining portion of the roller 17b, i.e., the portion corresponding to the portion of the thin plate-like boiled fish paste 8 having no cornua 3, has a plurality of disc blades 17c spacing a distance therebetween.

The distance between the rollers 17a and 17b is adjusted so that the bottom of the slits 5 formed by the slitting machine 17 do not reach the lower surface of the thin plate-like boiled fish paste 8 and so that fibrous thin plate-like boiled fish paste 8 is obtained wherein portions 4 in the fibrous material formed by the slits 5 are substantially connected to each other by thin portions 4a.

Behind the roller type slitting machine 17, there is disposed a cutter (not shown) for forming transverse slits 7 (FIG. 7) of a suitable length on the thin plate-like boiled fish paste 9.

Figure 8:
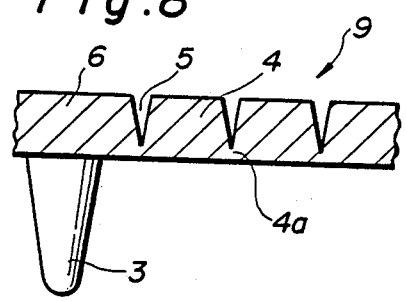
FIG. 8 is a partially enlarged view of FIG. 7.

Thus, as illustrated in FIG. 8, the thin plate-like boiled fish paste 9 is obtained, which has transverse slits 7 at a suitable interval in a longitudinal direction so as to facilitate easy eating and which has cornua 3 at a widthwise part of its rear surface and fibrous portions 4 formed at the remaining part and connected to each other by longitudinally extending thin portions 4a.

Figure 1:
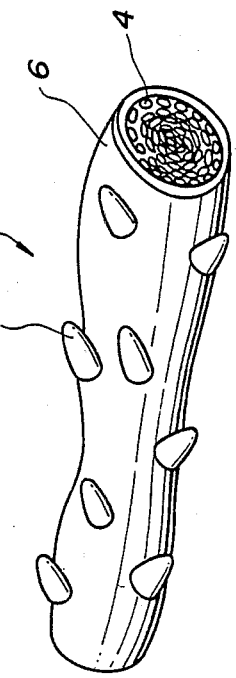
FIG. 1 is a perspective view of an embodiment of a fabricated meat product like the leg meat of the king crab according to the present invention.

On a wrapping conveyor belt 19, utilizing suitable guide means (not shown), the thin plate-like boiled fish paste 9 is rolled from the fibrous portions 4 to the portion 6 having cornua 3 like vinegared rice rolled in layer or a twisted paper string. Then the rolled boiled fish paste 9 is transferred by means of a pair of rollers 21 to an automatic cutting machine 20, where the rolled fish paste 9 is cut at a predetermined length. Thus, as illustrated in FIG. 1 fabricated meat product 1 like crab leg meat of the present invention is obtained. The product 1 comprises a central portion comprising fibrous material of ground fish meat 4 and gathered in a bar shape and a sheet-like material 6 mainly comprising ground fish meat, having cornua at an outer surface thereof and wrapping around said central portion 4, and the product 1 is formed in a shape of crab leg meat.

In this case, it is preferred that the cornua 3 are formed at a part of the outer surface of the sheet-like material so that product similar to the natural crab is obtained.

In the foregoing explanation, both cornua and fibrous material with longitudinally extending slits are formed on a single sheet-like material, and when the sheet-like material is rolled from the fibrous material portion, the fibrous material is gathered in a bar shape and is wrapped by the portion with cornua. Accordingly, production efficiency is high. Further, it is unnecessary to adjust shrinkages of the fibrous material and the sheet-like material when they are heated since the fibrous material and sheet-like material are formed on the same single material.

According to the present invention, the fibrous material with longitudinal slits and the sheet-like material with cornua may be individually prepared and may be combined together. This method needs individual machines and operators for preparing the fibrous material with longitudinal slits and the sheet-like material with cornua and further needs an additional step to combine the materials. However, the respective machine may be small.

Figure 7:
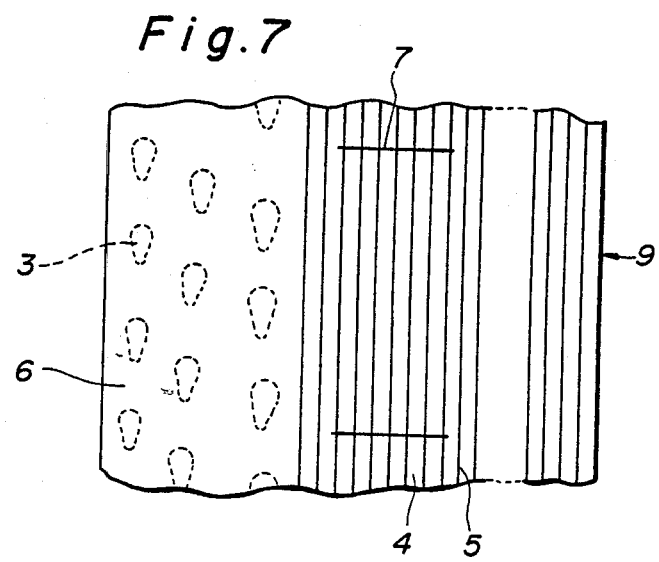
FIG. 7 is a plan view of the boiled fish paste formed in a thin plate.

Furthermore, though the fibrous thin plate-like boiled fish paste 9 illustrated in FIG. 7 has cornua 3 at a widthwise part thereof, the cornua 3 may be formed at the central portion sandwiched by fibrous materials 4 located at both the sides in another embodiment, and the fibrous materials are rolled from the sides.

The fibrous portions of the present invention may be separated from each other. However, it is preferred that portions in the fibrous material of ground fish meat are substantially connected to each other by means of the longitudinally extending thin portions though the portions in the fibrous material are partly discontinuous due to the longitudinal slits, because the portions in the fibrous material can be rolled like a sheet-like material. Accordingly, the operational efficiency can be enhanced.

In the foregoing embodiment, a continuous sheet-like ground fish meat is used, and the thin plate-like boiled fish paste obtained from the continuous sheet-like ground fish meat is treated while it is continuously transfered. Alternatively, sheet cut in a predetermined length may be used to carry out the present invention.

Other embodiments of the present invention will now be explained with reference to FIGS. 9 and 10.

In the above-described first embodiment, fibrous material was obtained by forming slits on ground fish meat 2, and the fibrous material was gathered to form the central portion. However, in these embodiments, flake of fish meat or flake or crustacean meat, such as crab meat, is used as the central portion, and thus the slitting step is omitted.

The flake of fish meat can be formed by cutting or slicing the frozen block of fish meat into small pieces by means of a frozen cutter or flake former of slicer type. The flake of crustacean meat can be obtained from the waste meat adhering to the crusts after main blocks of meat are taken up.

When the flake contains a sufficient amount of water therein, the flake may be used as it is or a certain amount of ground fish meat, egg white, starch or the like may be added. When the water contained in the flake is insufficient, it is preferred that bonding agent is added to increase bonding.

In addition, if desired, flavor of crabs, seasoning or coloring agent may be added to the flake.

In these embodiments wherein flake is used, the products may be continuously manufactured utilized belt conveyors similar to those used in the previously explained embodiment. Alternatively, some steps may be discontinued.

In FIG. 9(a) and 10(a), a sheet-like ground fish meat 30 with cornua 33 is formed in a manner similar to that for forming ground fish meat 2 in the first embodiment.

Then, as illustrated in FIG. 9(b), flake 34 is extruded in a film onto the sheet-like ground fish meat 30 from a slit-like cap (not shown). The width of the filmy flake 34 is set smaller than that of the sheet-like ground fish meat 30. As illustrated in FIG. 9(c), the filmy flake 34 and the sheet-like ground fish meat 30 are rolled together in a bar shape like vinegared rice rolled in layer or a twisted paper string. After the rolled bar is steamed, it is cut at a predetermined length, or it is steamed after it is cut at a predetermined length. Thus, the fabricated meat product like crab leg meat having cornua on the outer surface thereof of the present invention is obtained, as shown in FIG. 9(d).

In FIG. 10, in place of the extrusion of flake 34 in a film in FIG. 9, the flake 35 is extruded as illustrated in FIG. 10(b) in a bar shape having a suitable cross section, such as a circle, polygon, ellipse, from a cap (not shown), and the bar shaped flake 35 is wrapped by a sheet-like ground fish meat 30, as shown in FIG. 10(c). Thus, the fabricated meat product like crab let meat having cornua on the outer surface thereof of the present invention is obtained, as shown in FIG. 10(d).

Although the bar shaped flake 35 is extruded onto the sheet-like ground fish meat 30 in FIG. 10, the flake 35 may be shaped independent from the sheet-like ground fish 30 and may be wrapped by the latter after the flake is set up.

The fabricated meat product like crab leg meat of the present invention has cornua on the outer surface thereof.

When the size of the cornua is large, the fabricated meat product like crab leg meat of the present invention is similar to the first joint portion of the king crab, which has the highest quality in the natural crabs, and the fabricated meat product of the present invention has an appearance of high quality since its outer surface has cornua like the giant spider crab and it enhances beauty of the meal when it is burned as a crab leg meat steak or served in the pot.

When the fabricated meat product of the present invention has a relatively small diameter and many small cornua formed on the outer surface thereof, the fabricated meat product like crab leg meat is similar to the legs of the giant spider crab. The thus obtained fabricated meat product of the present invention can also be burned as a crab leg meat steak, served in the pot or be decorated on salad.

Further, according to the fabricated meat product like crab leg meat of the present invention, since a fibrous material or flake-like material is wrapped by the sheet-like material, which is not cut, the product does not scatter into small pieces and maintains its delicious shape when it is burned as a crab leg meat steak or served in the pot.

According to the process of the present invention, the above-described fabricated meat product like crab leg meat is manufactured by a step wherein ground meat mainly comprising fish meat is spread in a sheet onto a die member having cornua forming recesses on the outer surface thereof so as to form a sheet-like material having cornua on the outer surface thereof, a step wherein ground meat mainly comprising fish meat is spread in a sheet, and slits extending in a longitudinal direction of the sheet are is sliced onto the sheet so as to form fibrous material, and a step wherein the fibrous material is gathered into a bar shape, and the bar shaped fibrous material is wrapped by the sheet-like material having cornua.

When flake of crustacean meat, such as meat of crab, or flake of fish meat is used for the central portion of the present invention, since the flake is already in a fibrous condition, it is preferred that the flake is extruded from a cap and its periphery is wrapped by the sheet-like material or that the flake is extruded in a film on the sheet-like material and the filmy flake and the sheet-like material are twisted together.

What is claimed is:

1. A process for manufacturing fabricated crab leg meat, which process comprises:
   ground meat consisting essentially of fish meat in a sheet onto a die member having a cornua forming recesses on an outer surface thereof so as to form a sheet-like material having cornua on an outer surface thereof;
   spreading ground meat consisting essentially of fish meat in a sheet, and forming slits extending in a longitudinal direction of said sheet onto said sheet so as to form fibrous material; and then
   gathering said fibrous material into a bar shape, and wrapping said bar shaped fibrous material with said sheet-like material having cornua.

2. A process for manufacturing fabricated crab leg meat according to claim 1, wherein said ground meat is spread in a sheet onto said die member at a widthwise part of said outer surface thereof, and including heating said sheet-like material to form cornua by means of said cornua forming recesses and forming longitudinally extending slits at a portion of said sheet-like material having no cornua so as to form said fibrous material.

3. A process for manufacturing fabricate crab leg meat according to claim 2, wherein a conveyor belt having cornua forming recesses on a surface thereof is used as said die member.

4. A process for manufacturing fabricated crab leg meat according to claim 3, wherein said conveyor belt has said cornua forming recesses at a widthwise side thereof, whereby cornua are formed at a widthwise side portion of said sheet-like material.

5. A process for manufacturing fabricated crab leg meat according to claim 4, wherein ground fish meat is supplied onto said conveyor belt and is pressed onto said conveyor belt by a press roller to be spread into said sheet.

6. A process for manufacturing fabricated crab leg meat according to claim 2, wherein said ground fish meat is extruded into a sheet onto said conveyor belt.

7. A process for manufacturing fabricated crab leg meat according to claim 1, wherein thin portions are formed by said slits, and portions in said fibrous material are connected to each other by said thin portions.

8. A process for manufacturing fabricated crab leg meat, which process comprises:
   spreading ground meat consisting essentially of fish meat in a sheet onto a die member having cornua forming recesses on an outer surface thereof so as to form a sheet-like material having cornua on an outer surface thereof; and
   wrapping flake of fish meat or flake of crustacean meat with said sheet-like material having cornua.

9. A process for manufacturing fabricated crab leg meat according to claim 8, wherein said flake is extruded into a bar shape from a cap onto said sheet-like material.

10. A process for manufacturing fabricated crab leg meat according to claim 8, wherein said ground meat is spread in a sheet onto said die member at a widthwise part of said outer surface thereof, and said flake is spread like a film onto said sheet-like material and is wrapped with said sheet-like material.

11. A process for manufacturing fabricated crab leg meat according to claim 8, wherein a conveyor belt having cornua forming recesses on a surface thereof is used as said die member.

* * * * *